US012663825B2

(12) United States Patent
Chen et al.

(10) Patent No.: US 12,663,825 B2
(45) Date of Patent: Jun. 23, 2026

(54) OVERSHOOT-FREE FAST START-UP BANDGAP REFERENCE CIRCUIT, CHIP, AND ELECTRONIC DEVICE

(71) Applicant: VANCHIP (TIANJIN) TECHNOLOGY CO., LTD., Tianjin (CN)

(72) Inventors: Cheng Chen, Tianjin (CN); Chunling Li, Tianjin (CN); Yongshou Wang, Tianjin (CN); Chenyang Gao, Tianjin (CN)

(73) Assignee: VANCHIP (TIANJIN) TECHNOLOGY CO., LTD., Tianjin (CN)

( * ) Notice: Subject to any disclaimer, the term of this patent is extended or adjusted under 35 U.S.C. 154(b) by 199 days.

(21) Appl. No.: 18/413,036

(22) Filed: Jan. 16, 2024

(65) Prior Publication Data

US 2024/0152172 A1 May 9, 2024

Related U.S. Application Data

(63) Continuation of application No. PCT/CN2022/141152, filed on Dec. 22, 2022.

(51) Int. Cl.

*G05F 3/26* (2006.01)
*G05F 1/46* (2006.01)
*G05F 1/575* (2006.01)
*G05F 3/30* (2006.01)

(52) U.S. Cl.

CPC .............. *G05F 3/262* (2013.01); *G05F 1/468* (2013.01); *G05F 1/575* (2013.01); *G05F 3/30* (2013.01)

(58) Field of Classification Search

CPC .......... G05F 1/468; G05F 1/575; G05F 3/262; G05F 3/30

See application file for complete search history.

(56) References Cited

U.S. PATENT DOCUMENTS 9,035,641 B1 * 5/2015 Le ........................... G05F 1/468 323/313
9,235,229 B2 * 1/2016 Zhang ....................... G05F 3/30
2020/0073430 A1 * 3/2020 Panja ....................... G05F 3/267
2021/0098031 A1 * 4/2021 Lin ........................... G05F 3/30
2021/0263548 A1 * 8/2021 Ho ........................... G05F 3/262

* cited by examiner

*Primary Examiner* — Lakaisha Jackson

(74) *Attorney, Agent, or Firm* — George Guosheng Wang; Upstream Research and Patent LLC

(57) ABSTRACT

An overshoot-free fast start-up bandgap reference circuit (100), a chip, and an electronic device. The bandgap reference circuit (100) comprises a bias current generating unit (101) and a reference core unit (102), wherein an output end of the bias current generating unit (101) is connected to an input end of the reference core unit (102), the bias current generating unit (101) generates a bias current ($I_{BIAS}$) unrelated to the voltage of a power supply and having a zero temperature coefficient, the bias current ($I_{BIAS}$) is an input signal of the reference core unit (102), and the reference core unit (102) generates a pre-charging current on the basis of the input bias current ($I_{BIAS}$) and implements overshoot-free fast start-up by means of employing pre-charging.

10 Claims, 5 Drawing Sheets

OVERSHOOT-FREE FAST START-UP BANDGAP REFERENCE CIRCUIT, CHIP, AND ELECTRONIC DEVICE

BACKGROUND

Technical Field

The present invention relates to a overshoot-free fast start-up bandgap reference circuit, and also relates to an integrated circuit chip and a corresponding electronic device that include the overshoot-free fast start-up bandgap reference circuit, and relates to the field of analog integrated circuit technologies.

Related Art

With the continuous development of an integrated circuit technology, an electronic device increasingly needs low power consumption and low latency performance. When the electronic device is in an idle state, each circuit module in an entire system is in a cut-off state, so that standby power consumption is effectively reduced. When an enable signal comes, each circuit module in the entire system can quickly start to enter a normal operating state. Therefore, the electronic device has increasingly high requirements on a startup process. As the most important part of an entire analog circuit system, startup time of a bandgap reference circuit greatly influences a startup speed of the entire system.

SUMMARY

A primary technical problem to be resolved by the present invention is to provide a overshoot-free fast start-up bandgap reference circuit (bandgap reference circuit for short). The bandgap reference circuit implements a overshoot-free fast start-up under all PVT (process, power supply voltage, and temperature) conditions.

Another technical problem to be resolved by the present invention is to provide an integrated circuit chip and a corresponding electronic device that include the overshoot-free fast start-up bandgap reference circuit.

To achieve the foregoing objectives, the present invention uses the following technical solutions:

According to a first aspect of an embodiment of the present invention, a overshoot-free fast start-up bandgap reference circuit is provided, including a bias current generation unit 101 and a reference core unit 102. An output end of the bias current generation unit 101 is connected to an input end of the reference core unit 102.

The bias current generation unit 101 generates a bias current that is not related to a power supply voltage and has a zero temperature coefficient, used as an input signal of the reference core unit 102.

The reference core unit 102 generates a pre-charge current based on the bias current, and implements a overshoot-free fast start-up in a pre-charge manner.

Preferably, the bias current generation unit 101 includes a first starting circuit 201 and a bias current generation circuit 202. An output end of the first starting circuit 201 is connected to an input end of the bias current generation circuit 202.

Preferably, the first starting circuit 201 includes a starting current generation branch 301, a proportional mirror and injection branch 302, and a feedback current cut-off control branch 303. The starting current generation branch 301 generates a starting current, and the proportional mirror and injection branch 302 proportionally mirrors the starting current and injects the starting current into the bias current generation circuit 202. After the bias current generation circuit 202 is started, the feedback current cut-off control branch 303 finally reduces the proportionally mirrored and injected current to zero by using feedback current cut-off control.

Preferably, the bias current generation circuit 202 includes a third NMOS transistor MN3, a fourth NMOS transistor MN4, a fifth NMOS transistor MN5, a sixth NMOS transistor MN6, a first PMOS transistor MP1, a second PMOS transistor MP2, a third PMOS transistor MP3, a fourth PMOS transistor MP4, a fifth PMOS transistor MP5, a sixth PMOS transistor MP6, and a thirteenth PMOS transistor MP13. The third NMOS transistor MN3, the fourth NMOS transistor MN4, the fifth NMOS transistor MN5, and the sixth NMOS transistor MN6 form NMOS current proportional mirror pair transistors in a cascode structure. The third PMOS transistor MP3, the fourth PMOS transistor MP4, the fifth PMOS transistor MP5, and the sixth PMOS transistor MP6 form PMOS current proportional mirror pair transistors in a cascode structure. The first PMOS transistor MP1, the second PMOS transistor MP2, the third PMOS transistor MP3, and the fourth PMOS transistor MP4 form PMOS current proportional mirror pair transistors in a cascode structure.

Preferably, the bias current generation circuit 202 further includes a first resistor R1, a second resistor R2, and a third resistor R3. An end of the first resistor R1 is connected to a source of the third PMOS transistor MP3, and the other end of the first resistor R1 is connected to a power supply end. An end of the second resistor R2 is connected to a drain of the fifth NMOS transistor MN5, and the other end of the second resistor R2 is separately connected to a drain of the sixth PMOS transistor MP6 and a gate of the fifth PMOS transistor MP5. An end of the third resistor R3 is separately connected to a drain of the sixth NMOS transistor MN6 and a gate of the fourth NMOS transistor MN4, and the other end is separately connected to a gate of the sixth NMOS transistor MN6 and a drain of the fourth PMOS transistor MP4.

Preferably, the first resistor R1, the second resistor R2, and the third resistor R3 each have different temperature coefficients.

Preferably, the reference core unit 102 includes a second starting circuit 401 and a reference core circuit 402. An output end of the second starting circuit 401 is connected to an input end of the reference core circuit 402.

Preferably, the second starting circuit 401 includes a bias current injection branch 501, a proportional mirror and injection branch 502, and a feedback current cut-off control branch 503. The bias current injection branch 501 receives the bias current output by the bias current generation unit 101. The proportional mirror and injection branch 502 proportionally mirrors the bias current to form a pre-charge current and injects the pre-charge current into the reference core circuit 402. The feedback current cut-off control branch 503 reduces the pre-charge current to zero after the reference core circuit 402 is started.

Preferably, the pre-charge current is divided into three currents. A first pre-charge current is a drain output current of a thirty-third PMOS transistor MP13, and is injected into an output end of the reference core circuit 402. A second pre-charge current is a drain output current of a thirty-fourth PMOS transistor MP14, and is injected into a non-inverting input end of a first operational amplifier in the reference core circuit 402. A third pre-charge current is a drain output current of a thirty-fifth PMOS transistor MP15, and is injected into an inverting input end of the first operational amplifier in the reference core circuit 402.

Preferably, the feedback current cut-off control branch 503 includes a twenty-second NMOS transistor MN2, a thirty-first PMOS transistor MP11, and a thirty-second PMOS transistor MP12. A drain of the twenty-second NMOS transistor MN2 is connected to a drain of the thirty-first PMOS transistor MP11 as well as a gate and a drain of the thirty-second PMOS transistor MP12. A source of the thirty-first PMOS transistor MP11 is connected to a power supply end. A gate of the thirty-first PMOS transistor MP11 is connected to an output end of a first operational amplifier in the reference core circuit 402.

When the reference core circuit (402) is started, a current on the thirty-first PMOS transistor MP11 is greater than a current on the twenty-second NMOS transistor (MN2). A gate voltage of the thirty-second PMOS transistor MP12 is increased to VDD. The pre-charge current is reduced to zero.

According to a second aspect of an embodiment of the present invention, an integrated circuit chip is provided, including the foregoing overshoot-free fast start-up bandgap reference circuit.

According to a third aspect of an embodiment of the present invention, an electronic device is provided, including the foregoing overshoot-free fast start-up bandgap reference circuit.

Compared with the conventional technology, the overshoot-free fast start-up bandgap reference circuit provided in the present invention implements a characteristic that the bias current is not related to a power supply voltage and has a zero-temperature coefficient by using a self-biased cascode current mirror structure and resistors with different temperature coefficient types. In addition, an establishment process of a loop bias point voltage and an output voltage of an operational amplifier is accelerated in a pre-charge manner, so that a overshoot-free fast start-up of the bandgap reference circuit can be implemented under all PVT (process, power supply voltage, and temperature) conditions, enabling the electronic device to have low power consumption and low latency performance.

DETAILED DESCRIPTION

The technical solutions of the present invention are further described in detail below with reference to the accompanying drawings and specific embodiments.

Figure 1:
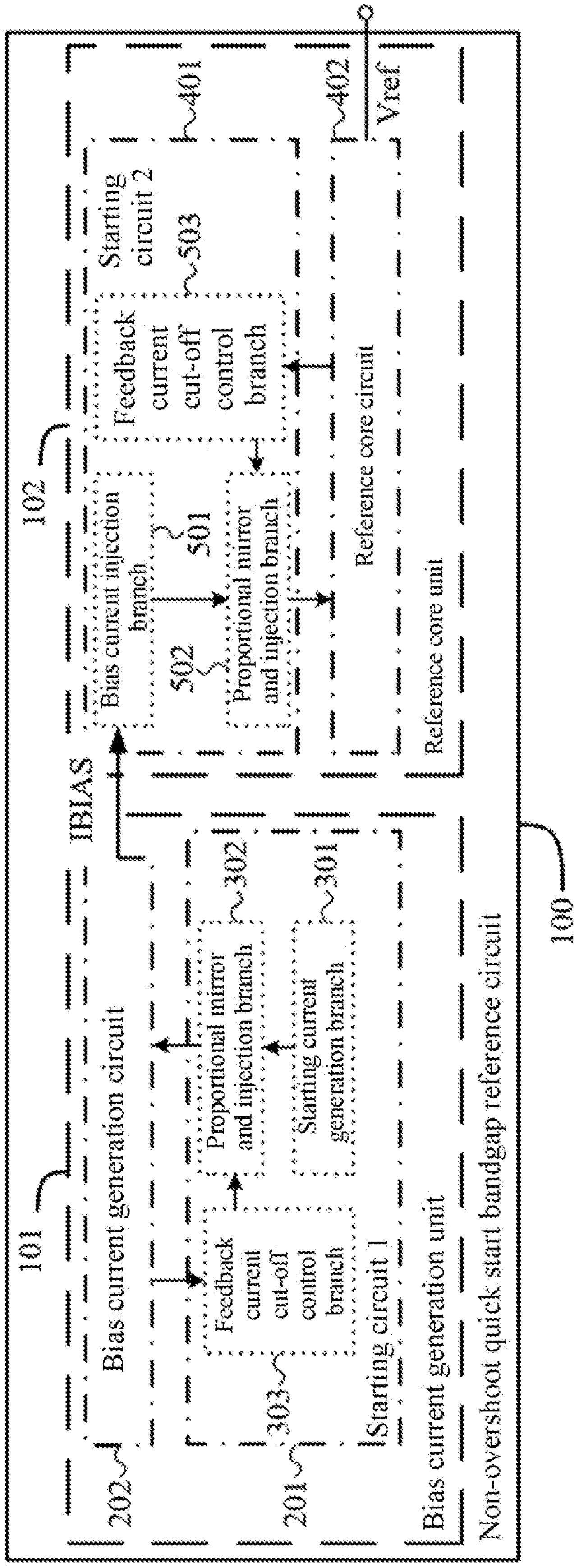
FIG. 1 is a schematic block diagram of a circuit of a overshoot-free fast start-up bandgap reference circuit provided in the present invention.

As shown in FIG. 1, a overshoot-free fast start-up bandgap reference circuit 100 provided in an embodiment of the present invention includes a bias current generation unit 101 and a reference core unit 102. An output end of the bias current generation unit 101 is connected to an input end of the reference core unit 102. The bias current generation unit 101 generates a bias current $I_{BIAS}$ that is not related to a power supply voltage and has a zero-temperature coefficient, used as an input signal of the reference core unit 102. The reference core unit 102 generates a pre-charge current and a current required for an operation of an operational amplifier based on the input bias current $I_{BIAS}$, and implements a overshoot-free fast start-up in a pre-charge manner.

A circuit structure and an operating principle of the bias current generation unit 101 and reference core unit 102 are described in detail below.

In an embodiment of the present invention, the bias current generation unit 101 includes a first starting circuit 201 and a bias current generation circuit 202. An output end of the first starting circuit 201 is connected to an input end of the bias current generation circuit 202. The bias current generation circuit 202 generates a bias current $I_{BIAS}$ that is not related to a power supply voltage and has a zero temperature coefficient, and the bias current $I_{BIAS}$ is an input signal of the reference core unit 102.

The first starting circuit 201 includes a starting current generation branch 301, a proportional mirror and injection branch 302, and a feedback current cut-off control branch 303. The starting current generation branch 301 generates a starting current. The proportional mirror and injection branch 302 proportionally mirrors the starting current and injects the starting current into the bias current generation circuit 202. After the bias current generation circuit 202 is started, the feedback current cut-off control branch 303 finally reduces the proportionally mirrored and injected current to zero by using feedback current cut-off control.

Figure 2:
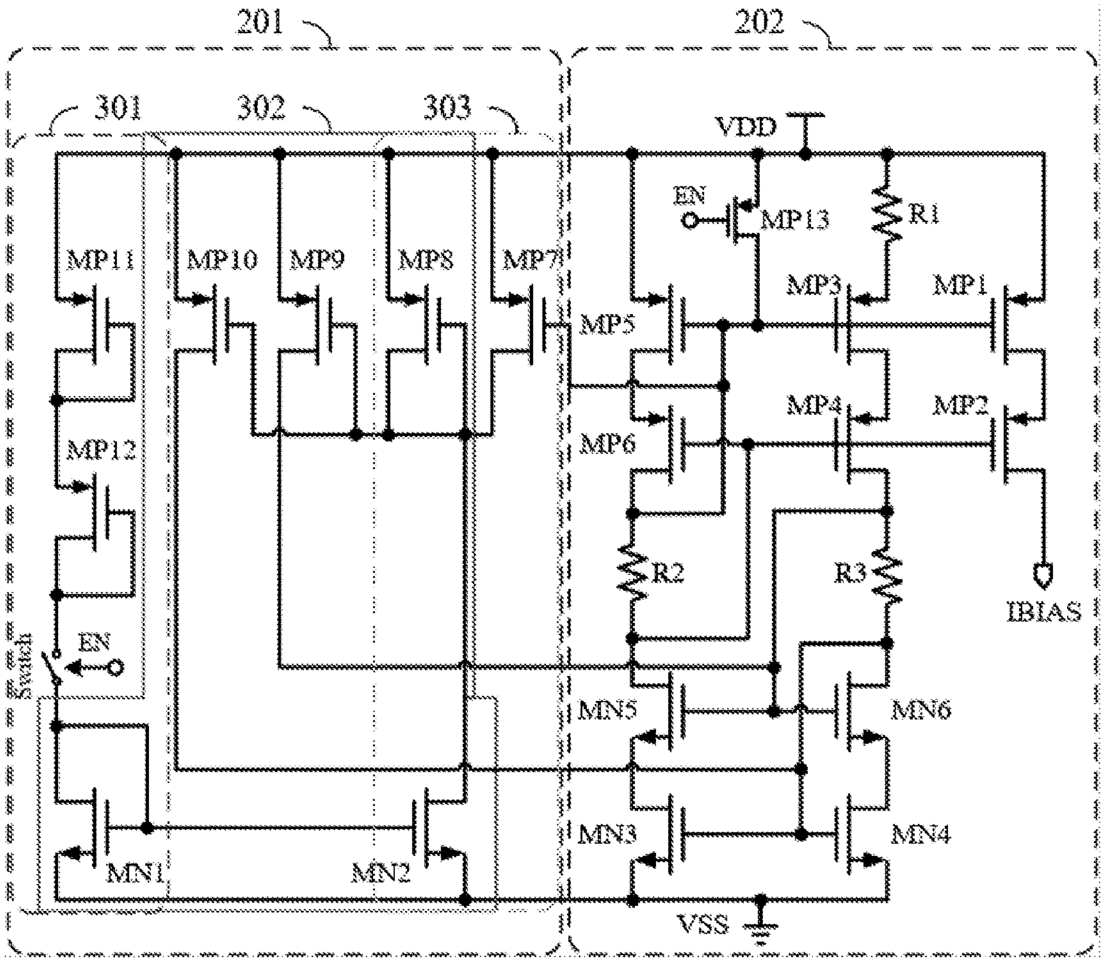
FIG. 2 is a schematic diagram of a circuit of a bias current generation unit in an embodiment of the present invention.

As shown in FIG. 2, in an embodiment of the present invention, the starting current generation branch 301 includes an eleventh PMOS transistor MP11, a twelfth PMOS transistor MP12, a first NMOS transistor MN1, and a first switch transistor. The first switch transistor receives an input by an enable signal. An end of the first switch transistor is connected to a drain of the twelfth PMOS transistor MP12, and the drain and a gate of the twelfth PMOS transistor MP12 are short-circuited. A source of the twelfth PMOS transistor MP12 is connected to a drain of the eleventh PMOS transistor MP11, the drain and a gate of the eleventh PMOS transistor MP11 are short-circuited, and a source of the eleventh PMOS transistor MP11 is connected to a power supply end VDD. The other end of the first switch transistor is connected to a drain of the first NMOS transistor MN1, the drain and a gate of the first NMOS transistor MN1 are short-circuited, and a source of the first NMOS transistor MN1 is connected to a common ground end VSS.

When the circuit is not enabled, that is, EN=0 V, the first switch transistor cuts off, a current of a branch where the first switch transistor is located is zero, and no starting current is generated. When the circuit is enabled, that is, EN=VDD, the first switch transistor turns on, a branch where the first switch transistor is located generates a starting current, and the starting current is input to the proportional mirror and injection branch 302.

In an embodiment of the present invention, the proportional mirror and injection branch 302 includes a first NMOS transistor MN1, a second NMOS transistor MN2, an eighth PMOS transistor MP8, a ninth PMOS transistor MP9, and a tenth PMOS transistor MP10. The first NMOS transistor MN1 and the second NMOS transistor MN2 form NMOS current proportional mirror pair transistors, and the eighth PMOS transistor MP8, the ninth PMOS transistor MP9, and the tenth PMOS transistor MP10 form PMOS current proportional mirror pair transistors. Specifically, a gate of the second NMOS transistor MN2 is connected to a gate of the first NMOS transistor MN1. A source of the second NMOS transistor MN2 is connected to the common ground end VSS. A drain of the second NMOS transistor MN2 is connected to a gate of the eighth PMOS transistor MP8. A source of the eighth PMOS transistor MP8 is connected to the power supply end VDD. A drain and the gate of the eighth PMOS transistor MP8 are short-circuited. A source of the ninth PMOS transistor MP9 and a source of the tenth PMOS transistor MP10 are separately connected to the power supply end VDD. A gate of the ninth PMOS transistor MP9 and a gate of the tenth PMOS transistor MP10 are both connected to the drain of the second NMOS transistor MN2. A drain of the ninth PMOS transistor MP9 and a drain of the tenth PMOS transistor MP10 are separately connected to the bias current generation circuit 202.

When the circuit is not enabled, the ninth PMOS transistor MP9 and the tenth PMOS transistor MP10 have no current injected into the bias current generation circuit 202. When the circuit is enabled, the NMOS current proportional mirror pair transistors (MN1 and MN2) and the PMOS current proportional mirror pair transistors (MP8, MP9, and MP10) proportionally mirror the starting current of the branch where the first switch transistor is located and then inject the starting current into the bias current generation circuit 202 in two currents, so that gate voltages of the fourth NMOS transistor MN4 and the sixth NMOS transistor MN6 increase quickly.

In an embodiment of the present invention, the feedback current cut-off control branch 303 includes a second NMOS transistor MN2, a seventh PMOS transistor MP7, and an eighth PMOS transistor MP8. A source of the seventh PMOS transistor MP7 is connected to the power supply end VDD. A drain of the seventh PMOS transistor MP7 is connected to a drain and a gate of the eighth PMOS transistor MP8 as well as a drain of the second NMOS transistor MN2. A gate of the seventh PMOS transistor MP7 is connected to the bias current generation circuit 202.

According to KCL (Kirchhoff) law, it may be learned that $I_{MN2}=I_{MP7}+I_{MP8}$. When the bias current generation circuit 202 is not started, a current on the seventh PMOS transistor MP7 is less than a current on the second NMOS transistor MN2, that is, $I_{MP7}<I_{MN2}$. In this case, $I_{MP8}$ is proportionally mirrored to generate two injected currents that are injected into the bias current generation circuit 202. When the bias current generation circuit 202 is started, a current on the seventh PMOS transistor MP7 is greater than a current on the second NMOS transistor MN2, that is, $I_{MP7}>I_{MN2}$. A gate voltage of the eighth PMOS transistor MP8 is increased to the power supply end VDD, so that $I_{MP7}=I_{MN2}$. In this case, $I_{MP8}=0$, that is, a proportionally mirrored and injected current is reduced to zero.

In an embodiment of the present invention, the bias current generation circuit 202 includes a third NMOS transistor MN3, a fourth NMOS transistor MN4, a fifth NMOS transistor MN5, a sixth NMOS transistor MN6, a first PMOS transistor MP1, a second PMOS transistor MP2, a third PMOS transistor MP3, a fourth PMOS transistor MP4, a fifth PMOS transistor MP5, a sixth PMOS transistor MP6, a thirteenth PMOS transistor MP13, a first resistor R1, a second resistor R2, and a third resistor R3. The third NMOS transistor MN3, the fourth NMOS transistor MN4, the fifth NMOS transistor MN5, and the sixth NMOS transistor MN6 form NMOS current proportional mirror pair transistors in a cascode structure. The third PMOS transistor MP3, the fourth PMOS transistor MP4, the fifth PMOS transistor MP5, and the sixth PMOS transistor MP6 form PMOS current proportional mirror pair transistors in a cascode structure. The first PMOS transistor MP1, the second PMOS transistor MP2, the third PMOS transistor MP3, and the fourth PMOS transistor MP4 form PMOS current proportional mirror pair transistors in a cascode structure. Specifically, a gate of the third NMOS transistor MN3 and a gate of the fourth NMOS transistor MN4 are connected and then jointly connected to an output of the proportional mirror and injection branch 302, that is, a drain of the tenth PMOS transistor MP10. A source of the third NMOS transistor MN3 and a source of the fourth NMOS transistor MN4 are separately connected to the common ground end VSS. A drain of the third NMOS transistor MN3 is connected to a source of the fifth NMOS transistor MN5. A drain of the fourth NMOS transistor MN4 is connected to a source of the sixth NMOS transistor MN6. A gate of the fifth NMOS transistor MN5 and a gate of the sixth NMOS transistor MN6 are connected and then are jointly connected to another output of the proportional mirror and injection branch 302, that is, a drain of the ninth PMOS transistor MP9. A drain of the sixth NMOS transistor MN6 is connected to the gate of the fourth NMOS transistor MN4 and the third resistor R3, and the other end of the third resistor R3 is connected to a gate of the sixth NMOS transistor MN6 and a drain of the fourth PMOS transistor MP4. A gate of the fourth PMOS transistor MP4 is connected to a gate of the sixth PMOS transistor MP6 and a gate of the second PMOS transistor MP2. A source of the fourth PMOS transistor MP4 is connected to a drain of the third PMOS transistor MP3. A gate of the third PMOS transistor MP3 is connected to a gate of the fifth PMOS transistor MP5 and a gate of the first PMOS transistor MP1. A source of the third PMOS transistor MP3 is connected to the first resistor R1, and the other end of the first resistor R1 is connected to the power supply end VDD. A drain of the fifth NMOS transistor MN5 is connected to the second resistor R2 and the gate of the fourth PMOS transistor MP4, and the other end of the second resistor R2 is separately connected to a drain of the sixth PMOS transistor MP6 and the gate of the fifth PMOS transistor MP5. A source of the sixth PMOS transistor MP6 is connected to a drain of the fifth PMOS transistor MP5, and a source of the fifth PMOS transistor MP5 is connected to the power supply end VDD. The gate of the fifth PMOS transistor MP5 is connected to a gate of a seventh PMOS transistor MP7 in the feedback current cut-off control branch 303, and the gate of the fifth PMOS transistor MP5 is connected to a drain of the thirteenth PMOS transistor MP13. A source of the thirteenth PMOS transistor MP13 is connected to the power supply end VDD, and a gate of the thirteenth PMOS transistor MP13 is connected to an input end EN of an enable signal. A source of the first PMOS transistor MP1 is connected to the power supply end VDD, and a drain of the first PMOS transistor MP1 is connected to a source of the second PMOS transistor MP2. A drain of the second PMOS transistor MP2 is connected to an input end of the reference core unit 102, to be specifically, the bias current $I_{BIAS}$ is input.

When the circuit is not enabled, that is, EN=0 V, the thirteenth PMOS transistor MP13 turns on, the gate of the third PMOS transistor MP3 and the gate of the fifth PMOS transistor MP5 are increased to high potential. Therefore, currents of branches where the fifth PMOS transistor MP5 and the sixth PMOS transistor MP6 are located are all zero. In this case, the gate of the fourth NMOS transistor MN4 and the gate of the sixth NMOS transistor MN6 are in a low potential state, and an entire circuit is in a stable zero-current state. When the circuit is enabled, that is, EN=VDD, the thirteenth PMOS transistor MP13 cuts off. In this case, the proportional mirror and injection branch 302 injects a mirrored and injected current into branches where the fourth NMOS transistor MN4 and the sixth NMOS transistor MN6 are located. Current proportional mirror pair transistors in a cascode structure that are the third NMOS transistor MN3, the fourth NMOS transistor MN4, the fifth NMOS transistor MN5, and the sixth NMOS transistor MN6 copy the injected current via proportional mirror, as a result, branches of the fifth PMOS transistor MP5, the sixth PMOS transistor MP6, the second resistor R2, the fifth NMOS transistor MN5, and the third NMOS transistor MN3 generate currents, and gate voltages of the fifth PMOS transistor MP5 and the sixth PMOS transistor MP6 are reduced. In the same way, the current proportional mirror pair transistors in a cascode structure that are the third PMOS transistor MP3, the fourth PMOS transistor MP4, the fifth PMOS transistor MP5, and the sixth PMOS transistor MP6 recopy the currents of branches where the fifth PMOS transistor MP5 and the sixth PMOS transistor MP6 are located via proportional mirror. Currents formed by the third PMOS transistor MP3 and the fourth PMOS transistor MP4 are superimposed on currents injected by the tenth PMOS transistor MP10 and the ninth PMOS transistor MP9, and are recopied by branches where the fifth NMOS transistor MN5 and the third NMOS transistor MN3 are located to form positive feedback, so that a bias current may be established quickly. As currents of branches where the fifth PMOS transistor MP5, the sixth PMOS transistor MP6, the second resistor R2, the fifth NMOS transistor MN5, and the third NMOS transistor MN3 are located increase, a current proportional mirror pair transistor that is the seventh PMOS transistor MP7 proportionally mirrors the currents of branches where the fifth PMOS transistor MP5 and the sixth PMOS transistor MP6 are located and inject the currents to the drain of the second NMOS transistor MN2. When $I_{MP7}>I_{MN2}$, a gate voltage of the eighth PMOS transistor MP8 is quickly increased to VDD, then $I_{MP7}=I_{MN2}$. According to $I_{MN2}=I_{MP8}+I_{MP7}$, it can be obtained that $I_{MP8}=0$. Therefore, injected currents injected by the ninth PMOS transistor MP9 and the tenth PMOS transistor MP10 into branches where the fourth NMOS transistor MN4 and the sixth NMOS transistor MN6 are located are reduced to zero, enabling the bias current generation unit 101 to enter a normal operating state.

In addition, a cascode bias current structure ensures that a generated bias current is not related to a power supply voltage. Moreover, the first resistor R1, the second resistor R2, and the third resistor R3 each use resistor types with different temperature coefficients. For example, the first resistor R1 may be a resistor with a positive temperature coefficient, and the second resistor R2 and the third resistor R3 may be resistors with negative temperature coefficients. Alternatively, the first resistor R1 may be a resistor with a negative temperature coefficient, and the second resistor R2 and the third resistor R3 may be resistors with positive temperature coefficients, thereby ensuring a characteristic that the generated bias current has zero temperature coefficient. Finally, current mirror pair transistors in a cascode structure that are the first PMOS transistor MP1, the second PMOS transistor MP2, the third PMOS transistor MP3, and the fourth PMOS transistor MP4 proportionally mirror the bias current to form an output bias current $I_{BIAS}$, and provides the bias current $I_{BIAS}$ for the reference core unit 102.

Figure 3:
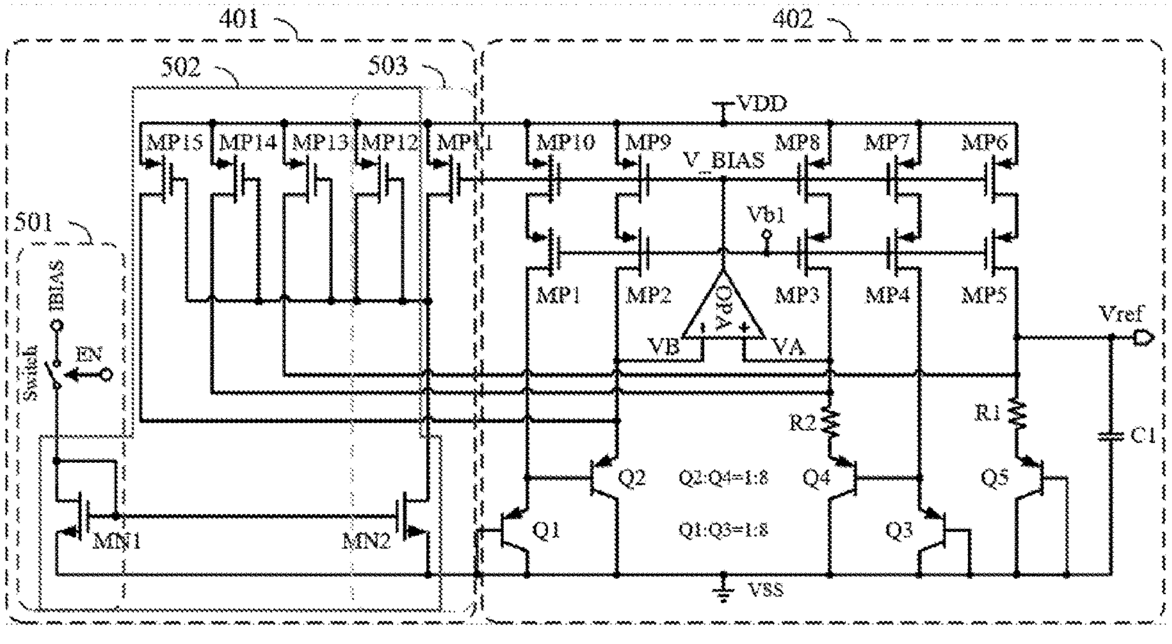
FIG. 3 is a schematic diagram of a circuit of a reference core unit in an embodiment of the present invention.

As shown in FIG. 3, in an embodiment of the present invention, the reference core unit 102 includes a second starting circuit 401 and a reference core circuit 402. An output end of the second starting circuit 401 is connected to an input end of the reference core circuit 402. The second starting circuit 401 receives the bias current $I_{BIAS}$ output by the bias current generation unit 101, proportionally mirrors the bias current $I_{BIAS}$ to generate a pre-charge current and injects the pre-charge current into the reference core circuit 402. The pre-charge current is finally reduced to zero by using feedback current cut-off control. After receiving the pre-charge current, the reference core circuit 402 generates an output voltage with a overshoot-free fast start-up.

In an embodiment of the present invention, the second starting circuit 401 includes a bias current injection branch 501, a proportional mirror and injection branch 502, and a feedback current cut-off control branch 503. The bias current injection branch 501 receives the bias current $I_{BIAS}$ output by the bias current generation unit 101. The proportional mirror and injection branch 502 proportionally mirrors the current $I_{BIAS}$ to form a pre-charge current and injects the pre-charge current into the reference core circuit 402. The feedback current cut-off control branch 503 reduces the pre-charge current to zero after the reference core circuit 402 is started.

In an embodiment of the present invention, the bias current injection branch 501 includes a twenty-first NMOS transistor MN1 and a second switch transistor (Switch). The second switch transistor receives an input by an enable signal, an end of the second switch transistor is connected to an output end of the bias current generation unit 101, and the other end of the second switch transistor is connected to a drain of the twenty-first NMOS transistor MN1. A source of the twenty-first NMOS transistor MN1 is connected to a common ground end VSS, the drain and a gate of the twenty-first NMOS transistor MN1 are short-circuited, and the gate of the twenty-first NMOS transistor MN1 is connected to a gate of a twenty-second NMOS transistor MN2 in the proportional mirror and injection branch 502.

When the circuit is not enabled, that is, EN=0 V, the second switch transistor cuts off, a current of a branch where the second switch transistor is located is zero, and currents of other branches are all zero. When the circuit is enabled, that is, EN=VDD, the second switch transistor turns on, and the current $I_{BIAS}$ output by the bias current generation circuit unit 101 is injected into the twenty-first NMOS transistor MN1 through the second switch transistor.

In an embodiment of the present invention, the proportional mirror and injection branch 502 includes a twenty-first NMOS transistor MN1, a twenty-second NMOS transistor MN2, a thirty-second PMOS transistor MP12, a thirty-third PMOS transistor MP13, a thirty-fourth PMOS transistor MP14, and a thirty-fifth PMOS transistor MP15. The twenty-first NMOS transistor MN1 and the twenty-second NMOS transistor MN2 form NMOS current proportional mirror pair transistors. The thirty-second PMOS transistor MP12, the thirty-third PMOS transistor MP13, the thirty-fourth PMOS transistor MP14, and the thirty-fifth PMOS transistor MP15 form PMOS current proportional mirror pair transistors. Specifically, the gate of the twenty-first NMOS transistor MN1 is connected to the gate of the twenty-second NMOS transistor MN2. A source of the twenty-second NMOS transistor MN2 is connected to the common ground end VSS. A drain of the twenty-second NMOS transistor MN2 is connected to a drain and a gate of the thirty-second PMOS transistor MP12, a gate of the thirty-third PMOS transistor MP13, a gate of the thirty-fourth PMOS transistor MP14, and a gate of the thirty-fifth PMOS transistor MP15. A source of the thirty-second PMOS transistor MP12, a source of the thirty-third PMOS transistor MP13, a source of the thirty-fourth PMOS transistor MP14, and a source of the thirty-fifth PMOS transistor MP15 are all connected to the power supply end VDD. A drain of the thirty-third PMOS transistor MP13 is connected to an output end Vref of the reference core circuit 402, a drain of the thirty-fourth PMOS transistor MP14 is connected to a non-inverting input end VA of a first operational amplifier OPA in the reference core circuit 402, and a drain of the thirty-fifth PMOS transistor MP15 is connected to an inverting input end VB of the first operational amplifier OPA in the reference core circuit 402.

When the circuit is not enabled, that is, EN=0 V, the second switch transistor cuts off, and currents of branches where the twenty-first NMOS transistor MN1 and the twenty-second NMOS transistor MN2 are located are both zero, so the thirty-third PMOS transistor MP13, the thirty-fourth PMOS transistor MP14, and the thirty-fifth PMOS transistor MP15 have no current injected into the non-inverting input end VA and inverting input end VB of the first operational amplifier OPA and the output end Vref of the reference core circuit 402. When the circuit is enabled, that is, EN=VDD, the second switch transistor turns on, and the current $I_{BIAS}$ output by the bias current generation circuit unit 101 is injected into the twenty-first NMOS transistor MN1. Current proportional mirror pair transistors that are the twenty-first NMOS transistor MN1 and the twenty-second NMOS transistor MN2 as well as current proportional mirror pair transistors that are the thirty-second PMOS transistor MP12, the thirty-third PMOS transistor MP13, the thirty-fourth PMOS transistor MP14, and the thirty-fifth PMOS transistor MP15 copy the current $I_{BIAS}$ via proportional mirror, to form three pre-charge currents. A first pre-charge current is a drain output current of the thirty-third PMOS transistor MP13, and is injected into the output end Vref of the reference core circuit 402, so that an output voltage increases quickly. A second pre-charge current is a drain output current of the thirty-fourth PMOS transistor MP14, and is injected into the non-inverting input end VA of the first operational amplifier OPA in the reference core circuit 402. A third pre-charge current is a drain output current of the thirty-fifth PMOS transistor MP15, and is injected into the inverting input end VB of the first operational amplifier OPA in the reference core circuit 402, so that a loop voltage controlled by the first operational amplifier OPA is established quickly, thereby quickly starting the bandgap reference circuit.

In an embodiment of the present invention, the feedback current cut-off control branch 503 includes a twenty-second NMOS transistor MN2, a thirty-first PMOS transistor MP11, and a thirty-second PMOS transistor MP12. A drain of the twenty-second NMOS transistor MN2 is connected to a drain of the thirty-first PMOS transistor MP11 as well as a gate and a drain of the thirty-second PMOS transistor MP12. A source of the thirty-first PMOS transistor MP11 is connected to a power supply end VDD. A gate of the thirty-first PMOS transistor MP11 is connected to an output end V_BIAS of a first operational amplifier OPA in the reference core circuit 402.

According to KCL (Kirchhoff) law, it may be learned that $I_{MN2}=I_{MP11}+I_{MP12}$. When the reference core circuit 402 is not started, a current on the thirty-first PMOS transistor MP11 is less than a current on the twenty-second NMOS transistor MN2, that is, $I_{MP11}<I_{MN2}$. In this case, $I_{MP12}$ is proportionally mirrored to form a pre-charge current, and is injected into the reference core circuit 402. When the reference core circuit 402 is started, a current on the thirty-first PMOS transistor MP11 is greater than a current on the twenty-second NMOS transistor MN2, that is, $I_{MP11}>I_{MN2}$, a gate voltage of the thirty-second PMOS transistor MP12 is increased to the power supply end VDD, so that $I_{MP11}=I_{MN2}$. In this case, $I_{MP12}=0$, that is, the pre-charge current is reduced to zero.

In an embodiment of the present invention, the reference core circuit 402 includes a twenty-first PMOS transistor MP1, a twenty-second PMOS transistor MP2, a twenty-third PMOS transistor MP3, a twenty-fourth PMOS transistor MP4, a twenty-fifth PMOS transistor MP5, a twenty-sixth PMOS transistor MP6, a twenty-seventh PMOS transistor MP7, a twenty-eighth PMOS transistor MP8, a twenty-ninth PMOS transistor MP9, a thirtieth PMOS transistor MP10, a twenty-first resistor R1, a twenty-second resistor R2, a first transistor Q1, a second transistor Q2, a third transistor Q3, a fourth transistor Q4, a fifth transistor Q5, a first capacitor C1, and a first operational amplifier OPA. A base and a collector of the first transistor Q1 are connected to the common ground end VSS, and an emitter of the first transistor Q1 is connected to a base of the second transistor Q2 and a drain of the twenty-first PMOS transistor MP1. A source of the twenty-first PMOS transistor MP1 is connected to a drain of the thirtieth PMOS transistor MP10. A source of the thirtieth PMOS transistor MP10 is connected to the power supply end VDD. A collector of the second transistor Q2 is connected to the common ground end VSS, and an emitter of the second transistor Q2 is connected to the inverting input end VB of the first operational amplifier OPA and a drain of the twenty-second PMOS transistor MP2. A source of the twenty-second PMOS transistor MP2 is connected to a drain of the twenty-ninth PMOS transistor MP9. A source of the twenty-ninth PMOS transistor MP9 is connected to the power supply end VDD. A base and a collector of the third transistor Q3 are connected to the common ground end VSS, and an emitter of the third transistor Q3 is connected to a base of the fourth transistor Q4 and a drain of the twenty-fourth PMOS transistor MP4. A source of the twenty-fourth PMOS transistor MP4 is connected to a drain of the twenty-seventh PMOS transistor MP7. A source of the twenty-seventh PMOS transistor MP7 is connected to the power supply end VDD. A collector of the fourth transistor Q4 is connected to the common ground end VSS, an emitter of the fourth transistor Q4 is connected to the twenty-second resistor R2, and the other end of the twenty-second resistor R2 is connected to the non-inverting input end VA of the first operational amplifier OPA and a drain of the twenty-third PMOS transistor MP3. A source of the twenty-third PMOS transistor MP3 is connected to a drain of the twenty-eighth PMOS transistor MP8. A source of the twenty-eighth PMOS transistor MP8 is connected to the power supply end VDD. A base and a collector of the fifth transistor Q5 are connected to the common ground end VSS, an emitter of the fifth transistor Q5 is connected to the twenty-first resistor R1, and the other end of the twenty-first resistor R1 is connected to a drain of the twenty-fifth PMOS transistor MP5 and the output end Vref. A source of the twenty-fifth PMOS transistor MP5 is connected to a drain of the twenty-sixth PMOS transistor MP6. A source of the twenty-sixth PMOS transistor MP6 is connected to the power supply end VDD. An end of the first capacitor C1 is connected to the common ground end VSS, and the other end of the first capacitor C1 is connected to the output end Vref. The output end V_BIAS of the first operational amplifier OPA is connected to a gate of the twenty-sixth PMOS transistor MP6, a gate of the twenty-seventh PMOS transistor MP7, a gate of the twenty-eighth PMOS transistor MP8, a gate of the twenty-ninth PMOS transistor MP9, and a gate of the thirtieth PMOS transistor MP10. A gate of the twenty-first PMOS transistor MP1, a gate of the twenty-second PMOS transistor MP2, a gate of the twenty-third PMOS transistor MP3, a gate of the twenty-fourth PMOS transistor MP4, and a gate of the twenty-fifth PMOS transistor MP5 are separately connected to a signal input end Vb1.

When the circuit is not enabled, that is, EN=0 V, currents of all branches in the circuit are zero. When the circuit is enabled, that is, EN=VDD, the three pre-charge currents of the proportional mirror and injection branch 502 are respectively injected into the non-inverting input end VA, the inverting input end VB of the first operational amplifier OPA, and the output end Vref of the reference core circuit 402, so that voltages of the non-inverting input end VA and the inverting input end VB increase quickly, thereby accelerating an establishment process of a loop bias point voltage of the first operational amplifier OPA. An output voltage V_BIAS of the first operational amplifier OPA starts to reduce from VDD, and branches of the twenty-sixth PMOS transistor MP6, the twenty-seventh PMOS transistor MP7, the twenty-eighth PMOS transistor MP8, the twenty-ninth PMOS transistor MP9, the thirtieth PMOS transistor MP10, and the thirty-first PMOS transistor MP11 that are provided with a bias signal by the V_BIAS voltage, generate currents. After the currents of branches of the twenty-eighth PMOS transistor MP8 and the twenty-ninth PMOS transistor MP9 as well as pre-charge currents injected into the non-inverting input end VA and the inverting input end VB by the proportional mirror and injection branch 502 are superimposed, a voltage establishment process of the non-inverting input end VA and the inverting input end VB is further accelerated. In a process of establishing a first operational amplifier OPA loop with a stable state, due to superposition of a pre-charge current injected by the thirty-third PMOS transistor MP13 in the proportional mirror and injection branch 502 and a current of a branch of the twenty-sixth PMOS transistor MP6 formed by the V_BIAS bias, the output voltage increases quickly. In addition, in a continuous establishment process of an output voltage of the bandgap reference circuit, due to the feedback current cut-off control branch 503, the pre-charge current is gradually reduced to zero, ensuring that each bias point voltage and output voltage in the entire circuit can be quickly stabilized.

Excellent performance of a bandgap reference circuit provided in the present invention is further verified below by using comparative experiments shown in FIG. 4 to FIG. 7.

Figure 4:
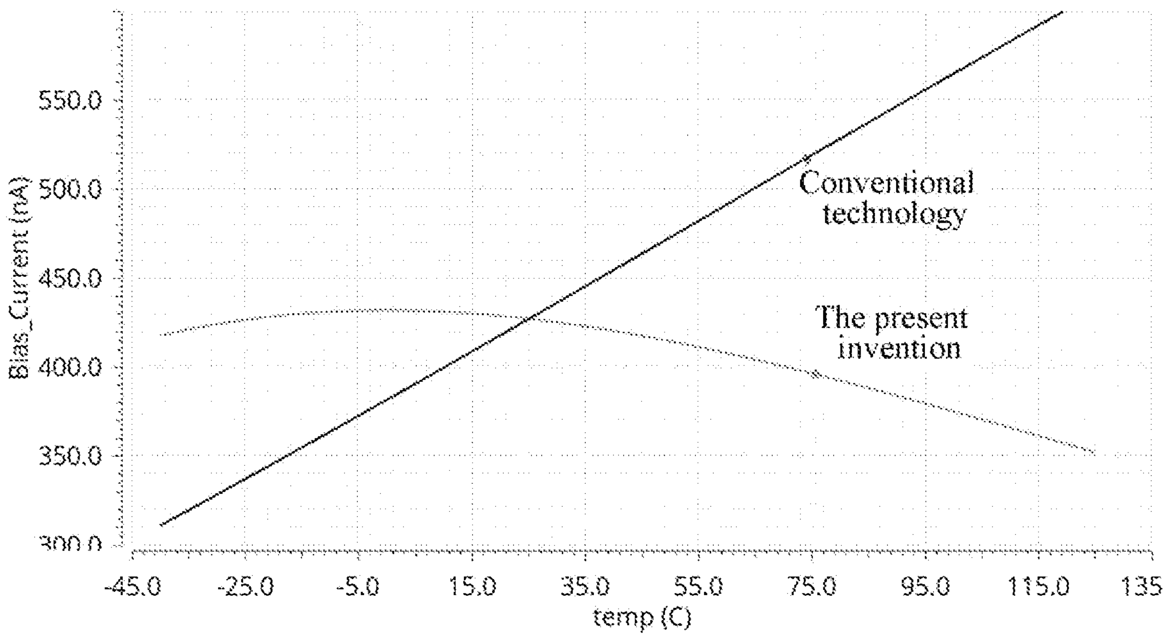
FIG. 4 is a curve comparison diagram of a bias current changing with temperature in an embodiment of the present invention.

FIG. 4 is a curve comparison diagram of a bias current changing with temperature in an embodiment of the present invention. From comparison of a bias current changing with temperature in the present invention and a bias current changing with temperature in the conventional technology, it can be learned that the bias current in the present invention has a characteristic of zero temperature coefficient, and has less change than the bias current in the conventional technology.

Figure 5:
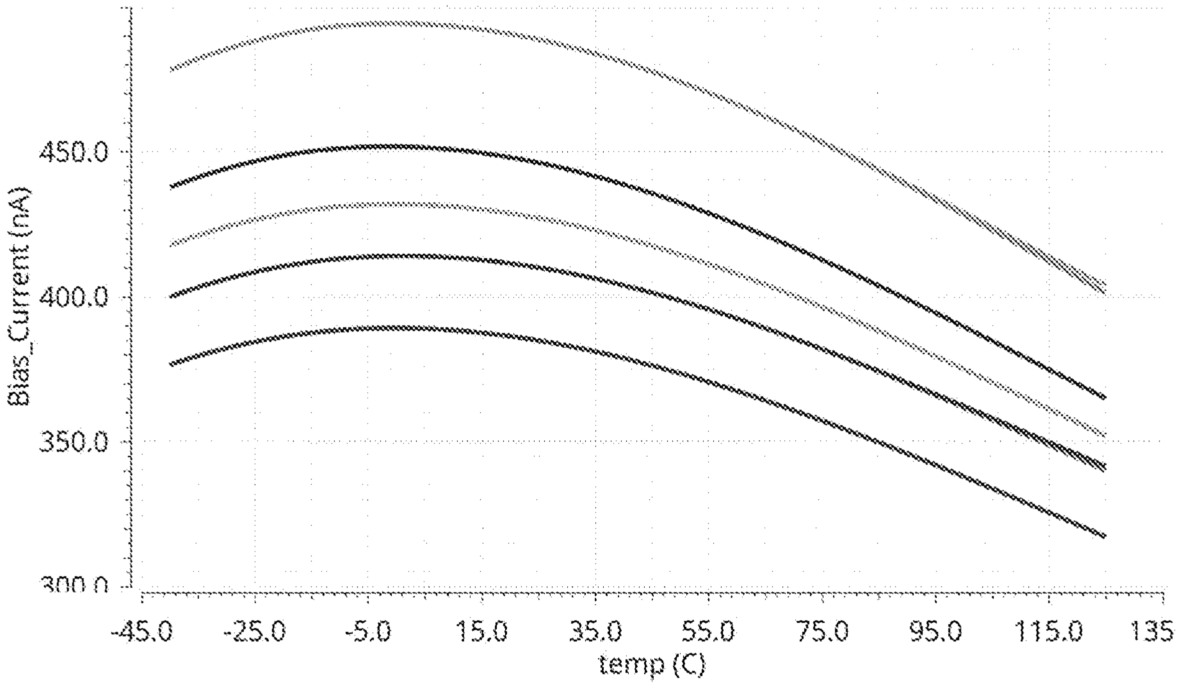
FIG. 5 is a curve diagram of a bias current under different PVT conditions changing with temperature in an embodiment of the present invention.

FIG. 5 is a curve diagram of a bias current under different PVT conditions changing with temperature in an embodiment of the present invention. As shown in FIG. 5, under different PVT conditions, the bias current in the present invention has a characteristic of zero temperature coefficient.

Figure 6:
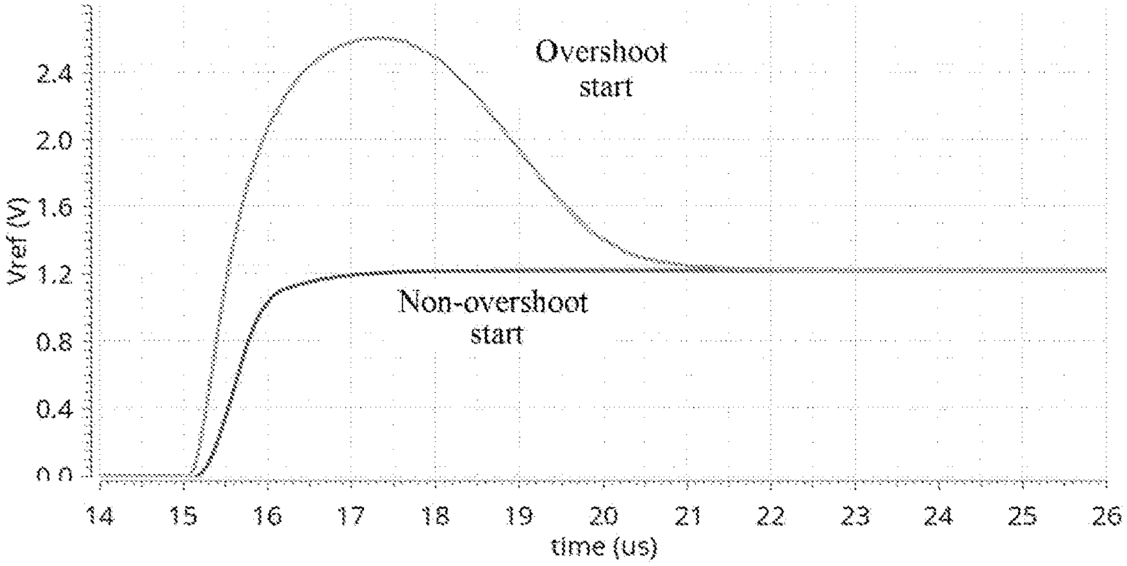
FIG. 6 is a comparison diagram of a non-overshoot starting voltage waveform and an overshoot starting voltage waveform in an embodiment of the present invention.

FIG. 6 is a comparison diagram of a non-overshoot starting voltage waveform and an overshoot starting voltage waveform in an embodiment of the present invention. As shown in FIG. 6, after a bandgap reference circuit provided in the present invention is enabled, a voltage waveform directly approaches 1.2 V and quickly stabilizes at 1.2 V. After an overshoot starting circuit in the conventional technology is enabled, a voltage waveform exceeds a reference voltage and reaches about 2.6 V before finally stabilizing at 1.2 V.

Figure 7:
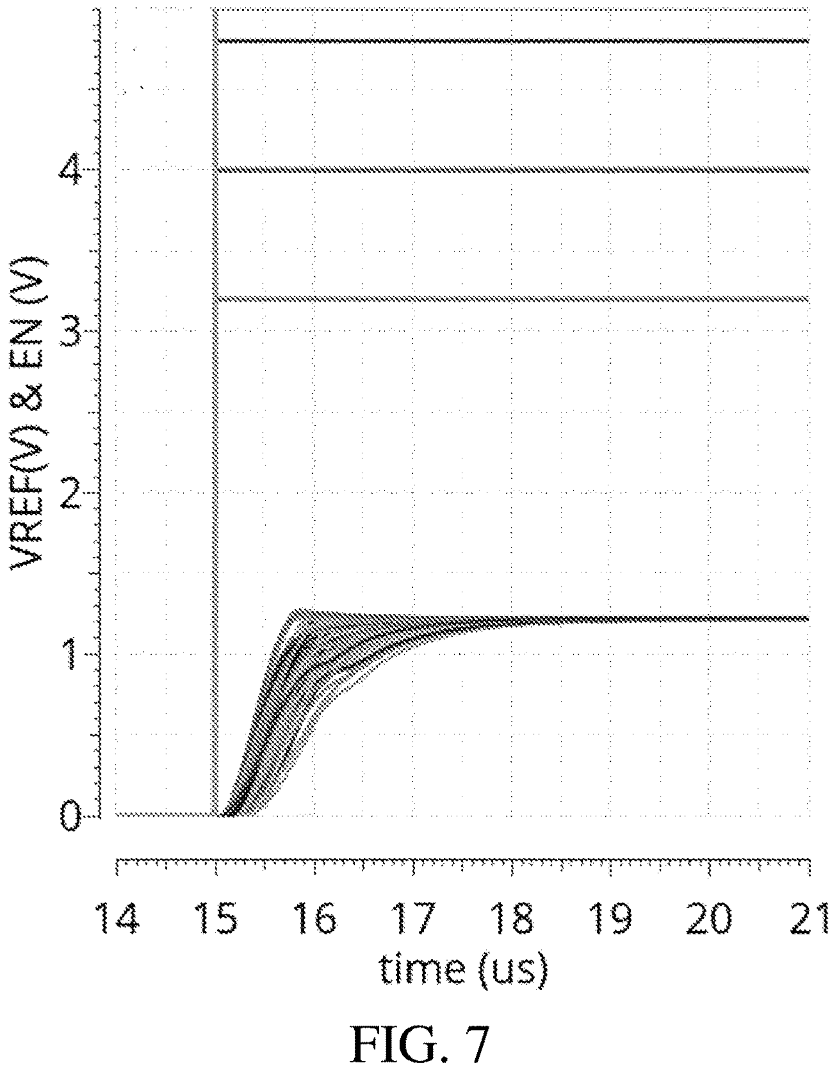
FIG. 7 is a waveform diagram of a starting voltage of a bandgap reference circuit under different PVT conditions in an embodiment of the present invention.

FIG. 7 is a waveform diagram of a starting voltage of a bandgap reference circuit under different PVT conditions in an embodiment of the present invention. As shown in FIG. 7, an output voltage of the bandgap reference circuit provided in the present invention can implement a overshoot-free fast start-up under different PVT conditions.

In addition, a overshoot-free fast start-up bandgap reference circuit provided in embodiments of the present invention may be used in an integrated circuit chip. A specific structure of the overshoot-free fast start-up bandgap reference circuit in the integrated circuit chip is not described in detail herein again.

The foregoing overshoot-free fast start-up bandgap reference circuit may also be used in an electronic device as an important part of an analog integrated circuit. The electronic device herein refers to a computer device that may be used in a mobile environment and support a plurality of communication standards such as GSM, EDGE, TD-SCDMA, TDD-LTE, and FDD-LTE, including a mobile phone, a laptop, a tablet, a vehicle-mounted computer, and the like. In addition, the technical solutions provided in embodiments of the present invention are also applicable to another analog integrated circuit application scenario, such as a communication base station.

Figure 8:
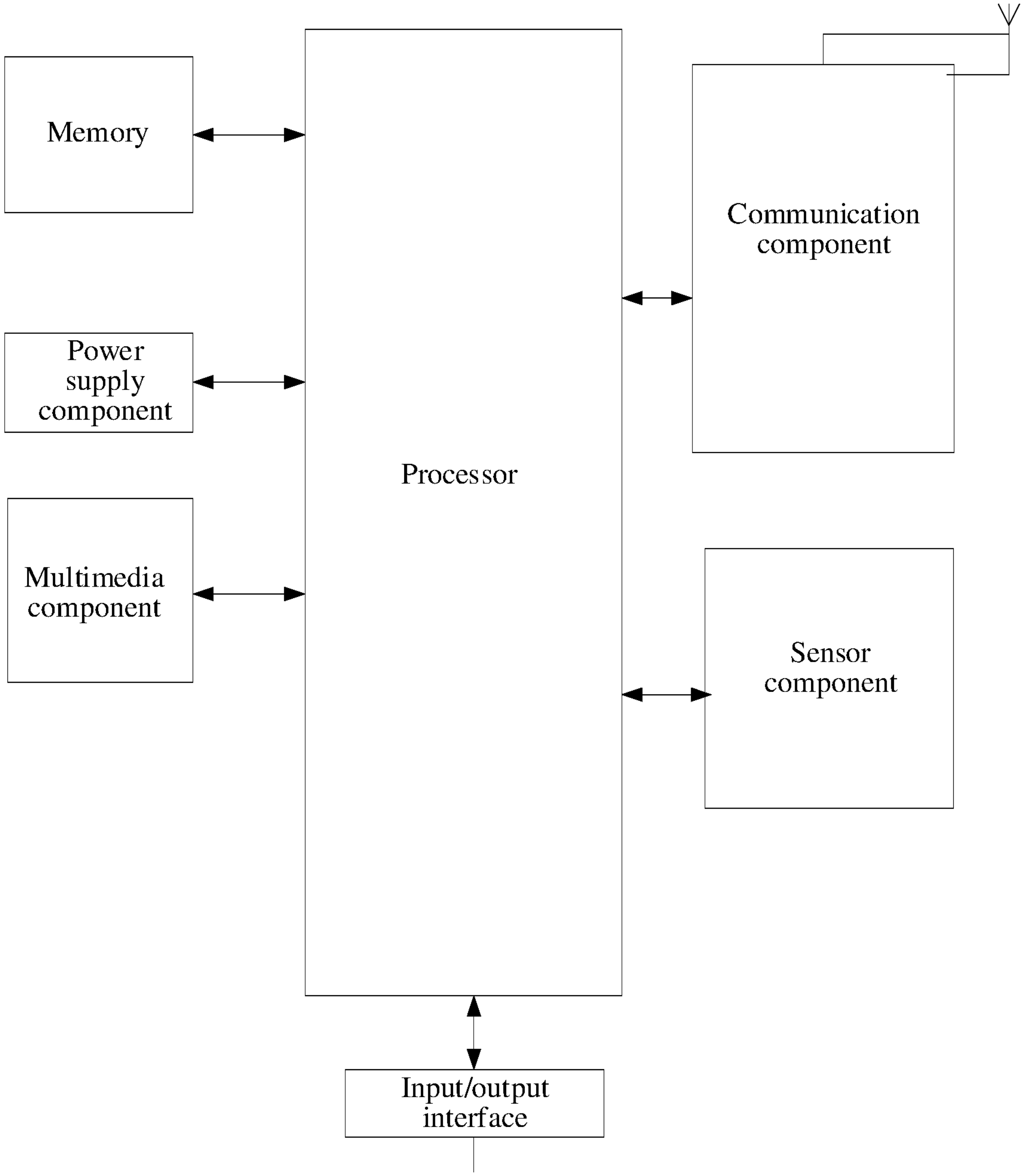
FIG. 8 is an exemplary diagram of an electronic device using the present overshoot-free fast start-up bandgap reference circuit.

As shown in FIG. 8, the electronic device includes at least a processor and a memory, and may further include a communication component, a sensor component, a power supply component, a multimedia component, and an input/output interface according to actual needs. The memory, the communication component, the sensor component, the power supply component, the multimedia component, and the input/output interface are all connected to the processor. The memory may be a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and the like. The processor may be a central processing unit (CPU), a graphics processing unit (GPU), a field-programmable gate array (FPGA), an application-specific integrated circuit (ASIC), a digital signal processing (DSP) chip, and the like. Another communication component, sensor component, power supply component, multimedia component, and the like may all be implemented by using a universal component. Details are not described herein again.

Compared with the conventional technology, the overshoot-free fast start-up bandgap reference circuit provided in the present invention implements a characteristic that the bias current is not related to a power supply voltage and has a zero-temperature coefficient by using a self-biased cascode current mirror structure and resistors with different temperature coefficient types. In addition, an establishment process of a loop bias point voltage and an output voltage of an operational amplifier is accelerated in a pre-charge manner, so that a overshoot-free fast start-up of the bandgap reference circuit can be implemented under all PVT conditions, enabling the electronic device to have low power consumption and low latency performance.

The foregoing descriptions explain the overshoot-free fast start-up bandgap reference circuit, the chip, and the electronic device provided in the present invention in detail. For a person of ordinary skill in the art, any obvious modification made to the present invention without departing from the essence of the present invention falls within the scope of protection of the patent rights of the present invention.

What is claimed is:

1. An overshoot-free fast start-up bandgap reference circuit, comprising a bias current generation unit (101) and a reference core unit (102), wherein an output end of the bias current generation unit (101) is connected to an input end of the reference core unit (102);

the bias current generation unit (101) generates a bias current that is not related to a power supply voltage and has a zero-temperature coefficient, used as an input signal of the reference core unit (102);

the reference core unit (102) comprises a second starting circuit (401) and a reference core circuit (402); and an output end of the second starting circuit (401) is connected to an input end of the reference core circuit (402); the second starting circuit (401) comprises a bias current injection branch (501), a proportional mirror and injection branch (502), and a feedback current cut-off control branch (503); the bias current injection branch (501) receives the bias current output by the bias current generation unit (101); the proportional mirror and injection branch (502) proportionally mirrors the bias current to form a pre-charge current and injects the pre-charge current into the reference core circuit (402); and the feedback current cut-off control branch (503) reduces the pre-charge current to zero after the reference core circuit (402) is started.

2. The overshoot-free fast start-up bandgap reference circuit according to claim 1, wherein the bias current generation unit (101) comprises a first starting circuit (201) and a bias current generation circuit (202); and an output end of the first starting circuit (201) is connected to an input end of the bias current generation circuit (202).

3. The overshoot-free fast start-up bandgap reference circuit according to claim 2, wherein the first starting circuit (201) comprises a starting current generation branch (301), a proportional mirror and injection branch (302), and a feedback current cut-off control branch (303); the starting current generation branch (301) generates a starting current, and the proportional mirror and injection branch (302) proportionally mirrors the starting current and injects the starting current into the bias current generation circuit (202); and after the bias current generation circuit (202) is started, the feedback current cut-off control branch (303) reduces the proportionally mirrored and injected current to zero by using feedback current cut-off control.

4. The overshoot-free fast start-up bandgap reference circuit according to claim 2, wherein the bias current generation circuit (202) comprises a third NMOS transistor (MN3), a fourth NMOS transistor (MN4), a fifth NMOS transistor (MN5), a sixth NMOS transistor (MN6), a first PMOS transistor (MP1), a second PMOS transistor (MP2), a third PMOS transistor (MP3), a fourth PMOS transistor (MP4), a fifth PMOS transistor (MP5), a sixth PMOS transistor (MP6), and a thirteenth PMOS transistor (MP13);

the third NMOS transistor (MN3), the fourth NMOS transistor (MN4), the fifth NMOS transistor (MN5), and the sixth NMOS transistor (MN6) form NMOS current proportional mirror pair transistors in a cascode structure;

the third PMOS transistor (MP3), the fourth PMOS transistor (MP4), the fifth PMOS transistor (MP5), and the sixth PMOS transistor (MP6) form a first set of PMOS current proportional mirror pair transistors in a cascode structure; and the first PMOS transistor (MP1), the second PMOS transistor (MP2), the third PMOS transistor (MP3), and the fourth PMOS transistor (MP4) form a second set of PMOS current proportional mirror pair transistors in a cascode structure.

5. The overshoot-free fast start-up bandgap reference circuit according to claim 4, wherein the bias current generation circuit (202) further comprises a first resistor (R1), a second resistor (R2), and a third resistor (R3); an end of the first resistor (R1) is connected to a source of the third PMOS transistor (MP3), and the other end of the first resistor (R1) is connected to a power supply end; an end of the second resistor (R2) is connected to a drain of the fifth NMOS transistor (MN5), and the other end of the second resistor (R2) is separately connected to a drain of the sixth PMOS transistor (MP6) and a gate of the fifth PMOS transistor (MP5); and an end of the third resistor (R3) is separately connected to a drain of the sixth NMOS transistor (MN6) and a gate of the fourth NMOS transistor (MN4), and the other end of the third resistor (R3) is separately connected to a gate of the sixth NMOS transistor (MN6) and a drain of the fourth PMOS transistor (MP4).

6. The overshoot-free fast start-up bandgap reference circuit according to claim 5, wherein the first resistor (R1), the second resistor (R2), and the third resistor (R3) each have different temperature coefficients.

7. The overshoot-free fast start-up bandgap reference circuit according to claim 1, wherein the pre-charge current is divided into three currents; a first pre-charge current is a drain output current of a thirty-third PMOS transistor (MP13), and is injected into an output end of the reference core circuit (402); a second pre-charge current is a drain output current of a thirty-fourth PMOS transistor (MP14), and is injected into a non-inverting input end of a first operational amplifier in the reference core circuit (402); and a third pre-charge current is a drain output current of a thirty-fifth PMOS transistor (MP15), and is injected into an inverting input end of the first operational amplifier in the reference core circuit (402).

8. The overshoot-free fast start-up bandgap reference circuit according to claim 1, wherein the feedback current cut-off control branch (503) comprises a twenty-second NMOS transistor (MN2), a thirty-first PMOS transistor (MP11), and a thirty-second PMOS transistor (MP12); a drain of the twenty-second NMOS transistor (MN2) is connected to a drain of the thirty-first PMOS transistor (MP11) as well as a gate and a drain of the thirty-second PMOS transistor (MP12); a source of the thirty-first PMOS transistor (MP11) is connected to a power supply end; a gate of the thirty-first PMOS transistor (MP11) is connected to an output end of a first operational amplifier in the reference core circuit (402); and when the reference core circuit (402) is started, a current on the thirty-first PMOS transistor (MP11) is greater than a current on the twenty-second NMOS transistor (MN2), a gate voltage of the thirty-second PMOS transistor (MP12) is increased to VDD, and the pre-charge current is reduced to zero.

9. An integrated circuit chip, comprising the overshoot-free fast start-up bandgap reference circuit according to claim 1.

10. An electronic device, comprising the overshoot-free fast start-up bandgap reference circuit according to claim 1.

* * * * *